(12) United States Patent
Christomanos (10) Patent No.: US 11,115,112 B2
(45) Date of Patent: Sep. 7, 2021

(54) SYSTEM FOR TRANSMITTING COMMANDS AND A VIDEO STREAM BETWEEN A REMOTE CONTROLLED MACHINE SUCH AS A DRONE AND A GROUND STATION

(71) Applicant: UAVIA, Evry (FR)

(72) Inventor: Clément Christomanos, Paris (FR)

(73) Assignee: UAVIA, Evry (FR)

( * ) Notice: Subject to any disclaimer, the term of this patent is extended or adjusted under 35 U.S.C. 154(b) by 0 days.

(21) Appl. No.: 15/554,912

(22) PCT Filed: Mar. 2, 2016

(86) PCT No.: PCT/IB2016/051184
§ 371 (c)(1),
(2) Date: Aug. 31, 2017

(87) PCT Pub. No.: WO2016/139604
PCT Pub. Date: Sep. 9, 2016

(65) Prior Publication Data
US 2018/0091217 A1 Mar. 29, 2018

(30) Foreign Application Priority Data
Mar. 2, 2015 (FR) ..................... 15/51755

(51) Int. Cl.
*H04N 11/02* (2006.01)
*H04B 7/185* (2006.01)
(Continued)

(52) U.S. Cl.
CPC ....... *H04B 7/18506* (2013.01); *B64C 39/024* (2013.01); *G05D 1/0022* (2013.01);
(Continued)

(58) Field of Classification Search
CPC .............................................. H04B 7/18506
(Continued)

(56) References Cited

U.S. PATENT DOCUMENTS 6,868,314 B1    3/2005  Frink
6,973,501 B1 *  12/2005 Harris ..................... H04L 69/04
                                                        709/232
(Continued)

FOREIGN PATENT DOCUMENTS

EP          2450862 A1    5/2012

OTHER PUBLICATIONS

International Search Report (French and English) for PCT/IB2016/051184, ISA/EP, Rijswijk, NL, dated Jun. 21, 2016.
(Continued)

*Primary Examiner* — Leron Beck
(74) *Attorney, Agent, or Firm* — Harness, Dickey & Pierce, P.L.C.

(57) ABSTRACT

A system for transmitting commands and a video stream between a remote controlled machine such as a drone and a ground station comprises a two-way link between the machine and ground station, at least partially implementing a cellular communication network, said two-way link being provided by means of a cellular modem on the machine side and conveying a compressed video stream produced by a camera and a video encoding module, and information belonging to a group comprising movement control commands and flight data or operating characteristics of the remote controlled machine, the system further comprising means for managing the two-way link capable of ensuring said link is maintained, taking into account the variability in topology and performances of the link resulting from the implementation of the cellular communication network. Application to long-range drones.

17 Claims, 3 Drawing Sheets

(51) Int. Cl.

| | | |
|---|---|---|
| *G08C 17/02* | (2006.01) | |
| *H04N 19/115* | (2014.01) | |
| *H04N 19/164* | (2014.01) | |
| *B64C 39/02* | (2006.01) | |
| *G05D 1/00* | (2006.01) | |
| *H04L 12/26* | (2006.01) | |
| *H04L 12/801* | (2013.01) | |
| *H04N 7/18* | (2006.01) | |

(52) U.S. Cl.
CPC .......... *G08C 17/02* (2013.01); *H04L 43/0882* (2013.01); *H04L 47/12* (2013.01); *H04L 47/14* (2013.01); *H04N 7/185* (2013.01); *H04N 19/115* (2014.11); *H04N 19/164* (2014.11); *B64C 2201/127* (2013.01); *B64C 2201/146* (2013.01); *G08C 2201/50* (2013.01); *G08C 2201/60* (2013.01); *G08C 2201/93* (2013.01)

(58) Field of Classification Search
USPC ........................................ 375/240.01–240.29
See application file for complete search history.

(56) References Cited

U.S. PATENT DOCUMENTS

| | | | | |
|---|---|---|---|---|
| 7,072,977 | B1* | 7/2006 | Bernard | B64D 11/0015 |
| | | | | 709/238 |
| 7,158,877 | B2* | 1/2007 | Carlsson | G05D 1/0022 |
| | | | | 701/2 |
| 8,358,677 | B2* | 1/2013 | Collette | G05D 1/0044 |
| | | | | 370/427 |
| 8,665,313 | B2* | 3/2014 | Li | H04N 7/152 |
| | | | | 348/14.09 |
| 9,090,348 | B2* | 7/2015 | Lesperance | G05D 1/0016 |
| 9,477,226 | B2* | 10/2016 | Olson | H04W 4/70 |
| 2003/0236827 | A1* | 12/2003 | Patel | H04L 41/0896 |
| | | | | 709/203 |
| 2008/0037573 | A1* | 2/2008 | Cohen | H04L 29/06027 |
| | | | | 370/412 |
| 2011/0065469 | A1* | 3/2011 | Grabowsky | H04W 72/1236 |
| | | | | 455/509 |
| 2013/0050486 | A1* | 2/2013 | Omer | H04N 21/23614 |
| | | | | 348/144 |
| 2014/0269401 | A1* | 9/2014 | Gondi | H04L 43/0876 |
| | | | | 370/253 |
| 2016/0028471 | A1* | 1/2016 | Boss | H04W 84/06 |
| | | | | 455/406 |
| 2016/0094467 | A1* | 3/2016 | Hong | H04L 47/2441 |
| | | | | 370/235 |

OTHER PUBLICATIONS

Written Opinion of the ISA (French) for PCT/IB2016/051184, ISA/EP, Rijswijk, NL, dated Jun. 21, 2016.

* cited by examiner

SYSTEM FOR TRANSMITTING COMMANDS AND A VIDEO STREAM BETWEEN A REMOTE CONTROLLED MACHINE SUCH AS A DRONE AND A GROUND STATION

CROSS-REFERENCE TO RELATED APPLICATIONS

This application is a 371 U.S. National Stage of International Application No. PCT/IB2016/051184, filed Mar. 2, 2016, which claims the benefit of and priority to French Patent Application No. 15/51755, filed Mar. 2, 2015. The entire disclosures of the above applications are incorporated herein by reference.

FIELD OF THE INVENTION

The present invention relates to the transmission of piloting instructions and of video streams between a drone, that is to say a remote-controlled or autonomous aircraft of any type, and an operator on the ground.

Among the currently existing types of drones, rotary wing drones such as helicopters, quadcopters and the like can be cited. Fixed wing drones, propelled by one or more internal combustion engines or electric motors can also be cited.

More particularly, the present invention relates to the field of the transmission between a drone and its operator. The drones are remote-controlled, that is to say that there is a remote link between the operator and the drone. The operator can thus send piloting instructions to the drone, for example concerning the geographic position of the drone or the remote operation of embedded systems. A link in the return direction also exists, in order to allow, on the one hand, the drone to transmit information associated with the flight or the mission (altitude, speed, geographic position, etc.), and, on the other hand, to allow the drone to send to the operator a video stream, which is from an embedded camera.

This video stream is essential to the piloting of the machine or to the accomplishment of the missions, for example for a surveillance mission. The video stream notably allows for a so-called "immersive" piloting: the operator, instead of piloting the drone by watching the latter, uses the video link to pilot it, as if he or she were onboard the drone.

STATE OF THE ART

There are several techniques in the current art that make it possible to transmit piloting instructions to the drone, and that make it possible for the drone to transmit a stream of information and a video stream to its operator.

Among these techniques, the most commonplace is the use of links of microwave type, a technique notably used in model aircraft making. The operator and the drone have a radio transceiver system. A specific protocol allows the coding, the decoding and the transmission of the data or of the video. The use of this technique does however have significant drawbacks. Firstly, the use of the radiofrequency spectrum is subject to the regulation of local or state authorities. Thus, the system can transmit only over frequency bands for which an authorization has been obtained, or over frequency bands left free for use by the public. Secondly, the transmission of the radio waves in free space has intrinsic limitations, linked to physics. The natural attenuation of the radio waves and the presence of obstacles (multiple-path phenomena) reduces the quality of the transmission up to a distance at which the link is unusable. This distance is generally called the range of use of the link. Currently, radio links for drones allow maximum ranges of use of the order of 60 km, this datum being highly variable according to the topography of the terrain or the atmospheric conditions.

Another technique commonly used is the satellite-type radio link. A satellite in orbit around the Earth is used as transmission relay between the drone and its operator. This technique allows much greater ranges of use but the transmission and reception systems can be bulky, costly and complex to use, particularly given the problems caused by latency, that is to say the time of travel of the information.

Yet another technique uses a link of Wi-Fi (registered trademark) local area network or Bluetooth (registered trademark) type. A Wi-Fi network makes it possible to wirelessly link several computer appliances within a network in order to allow the transmission of data between them. Such networks are implementations of the IEEE 802.11 standards. Such a link can be used to allow bidirectional communication between the drone and its operator. These techniques have very limited ranges of use, of the order of 100 m for Wi-Fi.

A typical example of a drone using Wi-Fi or Bluetooth telecommunication techniques is the AR.Drone® from Parrot SA, Paris, France. The European patent application EP 2 450 862 A1 describes a "method for transmitting commands and a video stream between a drone and a remote control by a wireless network type link" using the Wi-Fi or Bluetooth techniques.

SUMMARY OF THE INVENTION

The current state of the art therefore does not offer any technique that makes it possible to pilot a drone over significant distances, typically of several hundreds of kilometers, in an effective and economically advantageous manner. The present invention sets out to resolve this issue by allowing the piloting of a drone and the transmission of a video stream over potentially unlimited distances, within the limit of the geographic mobile network coverage.

There is thus proposed, according to the invention, a system for transmitting commands and a video stream between a remote-controlled craft such as a drone and a ground station, characterized in that it comprises a bidirectional link between craft and ground station, at least partly implementing a cellular communication network, said bidirectional link being ensured by means of a cellular modem on the craft side and conveying, on the one hand, a compressed video stream generated by a camera and a video encoding module, and, on the other hand, information belonging to a group comprising movement control commands and flight data or piloting characteristics of the remote-controlled craft, the system further comprising means for managing the bidirectional link capable of ensuring that said link is maintained while taking account of the variability of topology and of performance levels of the link induced by the implementation of the cellular communication network.

This system can advantageously but optionally comprise the following additional features, taken in all combinations that a person skilled in the art will grasp as being technically compatible:

the craft and the ground station communicate over the bidirectional link via a packet-based protocol.

the link management means are capable of performing an adaptation of the bit rate of the compressed video stream by adjusting the encoding parameters of the video stream as a function of a measurement of the bandwidth of the bidirectional link from the craft to the station.

in the absence of a reliable measurement of the bandwidth, said adaptation is performed by repeatedly varying the encoding parameters to progressively increase the bit rate of the compressed video stream and by adjusting the encoding parameters to obtain a bit rate slightly lower than a rate which would cause a congestion phenomenon.

said adaptation is performed by reserving an incompressible portion of the bandwidth available for the routing of critical information.

the critical information belongs to a group comprising flight data, characteristics of the piloting of the remote-controlled craft and piloting or mission instructions.

said link management means are capable of calculating a score of quality of the bidirectional link at least from the station to the craft, and neutralizing flight instructions received in the case where said score is below a threshold.

said score is established as a function of at least two measurements of characteristics of the link among the latency, the rate of packets received in disorder, the rate of packets not received and the rate of packets and the rate of packets received incomplete.

said bidirectional link management means comprise the implementation of at least one session establishment protocol and of at least one NAT traversal or bypass protocol.

the link management means are capable of including in the messages of the session establishment protocol information relating to the type of point connected, namely craft or ground station.

the link management means are capable of including in the messages of the session establishment protocol information relating to the rights of a ground station over a craft.

said rights comprise rights to control the movement of the craft and rights to control the camera of the craft.

According to a second aspect, there is proposed a set of a remote-controlled craft such as a drone and a ground station, characterized in that it comprises a transmission system as defined above.

In one embodiment, this set further comprises at least one second ground station, one second bidirectional link between craft and ground station, at least partly implementing a cellular communication network, and second means for managing the second bidirectional link between the second ground station and the craft.

Preferred but optional aspects of such a set are as follows:

the first and second bidirectional link management means are capable of conveying information on respective rights of the two ground stations with respect to said craft.

the first and second bidirectional link management means are capable of routing critical instructions from the ground to the craft via the first bidirectional link or the second bidirectional link as a function of a type of criticality, namely temporal criticality or routing criticality.

Another aspect of the invention is a method for transmitting commands and a video stream between a remote-controlled craft such as a drone and a ground station, characterized in that it implements a bidirectional link at least partly implementing a cellular telephone communication network, said bidirectional link being ensured by means of a cellular modem on the craft side and conveying a compressed video stream generated by a camera and video encoding means, and at least one among piloting or mission instructions and flight data or characteristics of the piloting of the remote-controlled craft.

Preferentially but optionally, in this method:

the craft and the ground station communicate over the bidirectional link via an Internet protocol.

an adaptation of the bit rate of the compressed video stream is obtained by modulation of the compression rate of the video stream picked up by the camera.

said adaptation is performed by forcing, in the case where a reliable measurement of the available bandwidth margin is impossible, an increase in the bit rate of the compressed video stream or an increase in the definition of the compressed video stream, this forced increase being repeated at regular time intervals, so as to bring a set point of the encoding parameters just below the level at which the transmission of the video stream having these parameters would cause a congestion phenomenon.

said adaptation is performed while reserving a portion of the available bandwidth, which portion is incompressible and reserved for the routing of critical information such as flight data or characteristics of the piloting of the remote-controlled craft or for the routing of critical information such as piloting or mission instructions.

the method further comprises a transmission, in the downlink part (craft to station) of the bidirectional link, of flight data or characteristics of the piloting of the remote-controlled craft at constant bit rate.

the mission or piloting instructions are transmitted at constant time intervals and on action from the operator who decides on a change of the parameters of the mission currently being executed, these parameters being able to relate to at least one among the geographic position of the remote-controlled craft, its speed, its destination, its characteristic yaw, pitch and roll angles, its heading, the use of a sensor or of a specific actuator such as the orientation of a camera.

the video stream is received by the station and decoded via an interface, which consists of a web page viewed by the operator in a web browser, said page allowing the control of the remote-controlled craft and the display of parameters specific to its operation such as, in a nonlimiting manner, its geographic position, its speed, its destination, its characteristic angles, or other information from embedded sensors.

sensors are embedded onboard the remote-controlled craft in order to perform various missions such as, by way of nonlimiting example, imaging missions in the visible or infrared range, two- or three-dimensional mapping missions or various recordings of parameters from sensors present onboard. This method is characterized in that the connectivity of the remote-controlled craft to the Internet network enables it to store these data on a remote server or supply them in real time to the operator via an interface.

According to yet another aspect, there is proposed a set of a remote-controlled craft such as a drone and a ground station, characterized in that it comprises means for implementing the method as defined above and means for transmitting check and/or statistics packets and in order to analyze the quality of the bidirectional link in at least one of its directions or in both directions simultaneously, so as to modulate the video encoding parameters in the direction of a reduction of the bit rate of the compressed video stream or of a reduction of the definition of the compressed video stream when it is detected that the bandwidth available on the link does not allow the routing of the information stream without congestion phenomena, loss of packets or without excessive latency, and in the direction of an increase in the bit rate of the compressed video stream or of an increase in the definition of the compressed video stream when the available bandwidth is not fully used and that the increase in the definition of the compressed video stream is likely to represent an improvement of the user experience.

BRIEF DESCRIPTION OF THE DRAWINGS

There now follows a description of the implementation of the invention, with reference to the attached drawings in which the same numeric references denote, from one figure to another, identical or functionally similar elements. In the drawings.

DETAILED DESCRIPTION OF AN EMBODIMENT

Figure 1:
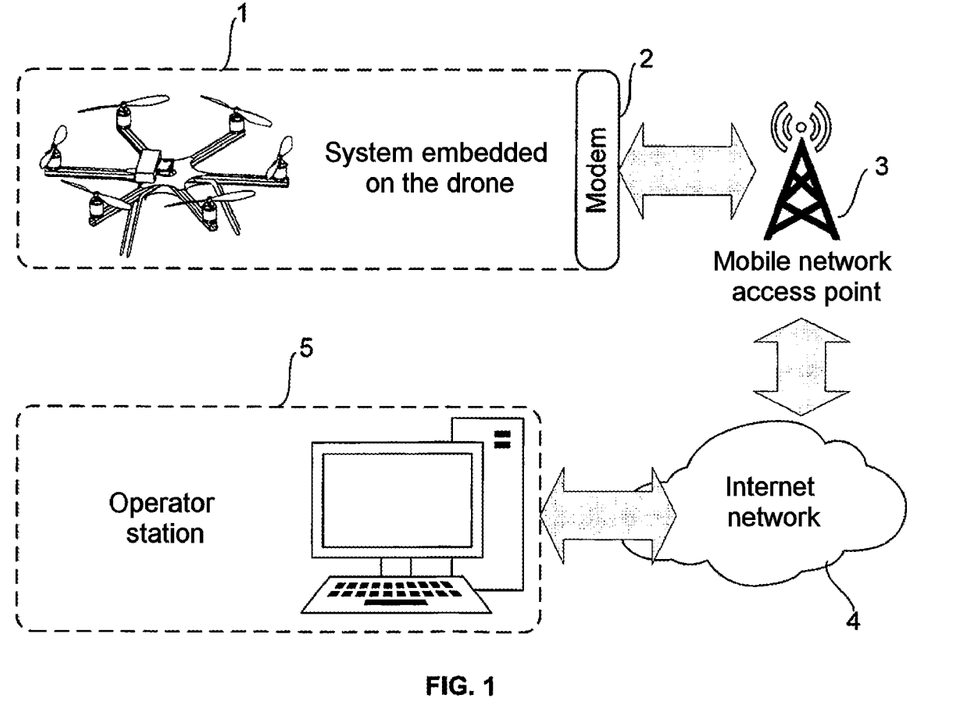
FIG. 1 illustrates the overall architecture of the invention.

The system according to the present invention comprises, according to the diagram presented in FIG. 1, two subsystems, the first being embedded on a drone 1, the second being a station 5 for an operator on the ground, the latter being able to take any form such as a computer, portable or not, a mobile terminal or any other system capable of producing the interface.

The two systems are linked by means of the Internet network 4, with the notable particular feature that the system embedded on the drone uses, to obtain an Internet connectivity, the commercial cellular telecommunication networks 3 using the technologies commonly called 2G, 3G, 3G+, H+, 4G, LTE, LTE-Advanced, 5G, WiMAX or the like. The ground system 5 allowing the operation of the drone can be linked to the Internet network 4 by different means, whether it be a conventional Internet connection, by the telephone network, by a wireless type network, or by the abovementioned mobile telecommunication networks.

Figure 2:
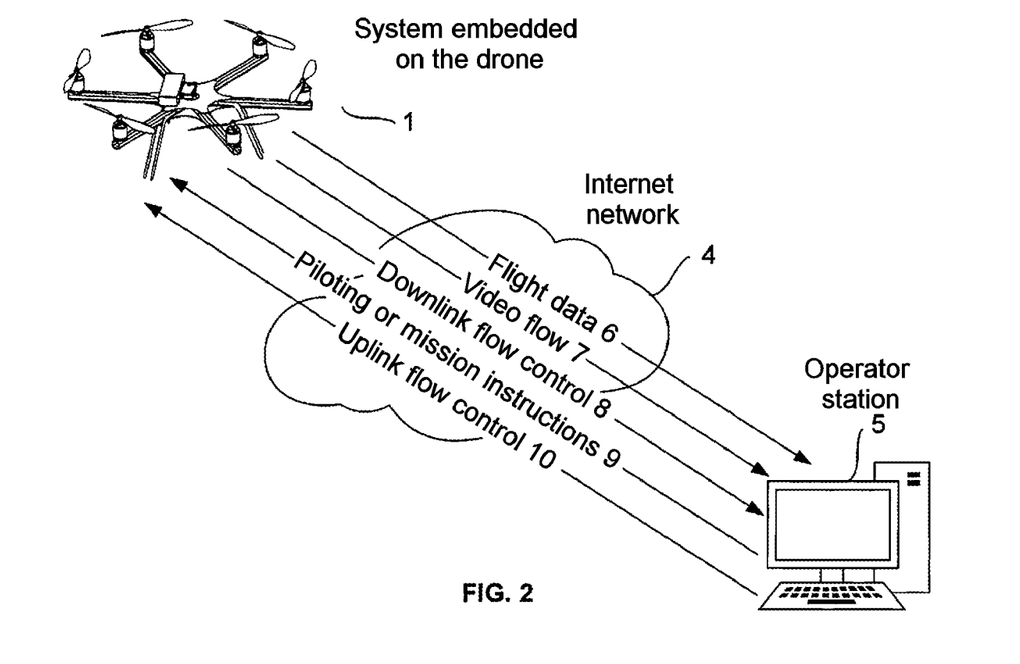
FIG. 2 illustrates the main exchanges of data between a craft and a ground station in this architecture.

FIG. 2 presents the different streams transmitted via the Internet network 4 between the system embedded on the drone 1 and the operator station 5.

What the communication means has already described make it possible to take into account is the great variability of the capacity of the channel linking the two systems. In effect, the drone 1 is mobile and connected to the Internet by the mobile telecommunication networks, of cellular type. Because of that, it is possible, during its flight, for the drone to change the point of access to the network 3. These access points are shared by several users of the network and the total capacity is therefore shared between the users. Thus, depending on the different loads in terms of users of the mobile telecommunication network access points, and depending on the path calculated over the Internet network 4 for the routing of the data and on the load in terms of users of the various equipment items crossed on this path, the capacity of the network to convey the information, more commonly called available bandwidth, is very greatly variable. In addition, depending on the technologies used at the point of access to the mobile network, whether it be 2G, 3G, 3G+, H+, 4G, LTE, LTE-Advanced, 5G, WiMAX or the like, the available uplink and downlink bit rates can be substantially different.

In order to guarantee the routing of the information through this channel over the network, it is necessary to observe the limit imposed by the available bandwidth. In effect, if the sending of the data is performed at a bit rate higher than the capacity of the channel, a congestion phenomenon occurs: the network cannot instantaneously transmit the information and is therefore forced to store it temporarily in order to retransmit it after a short time interval. This phenomenon therefore slows down the progress of the information within the network. In addition, in case of significant congestion, the equipment items situated on the network are likely to destroy data should they be incapable of transmitting them. These phenomena therefore induce latency, that is to say that the information transport time increases, as does the packet loss. Now, the remote control of a machine such as a drone requires a very low latency time (it is considered that beyond 200 milliseconds, the system would become uncomfortable to use) and quality video retransmission. With regard to the video retransmission, it is necessary, for comfortable use, to have a number of images per second that varies very little. Thus, the congestion phenomenon must at all costs be avoided.

According to one aspect of the invention, the system periodically measures the capacity of the network link, that is to say the bit rate at which it can transmit the information without provoking any congestion phenomenon, and adapts the data transmissions to this bit rate constraint by a flow control mechanism.

Figure 3:
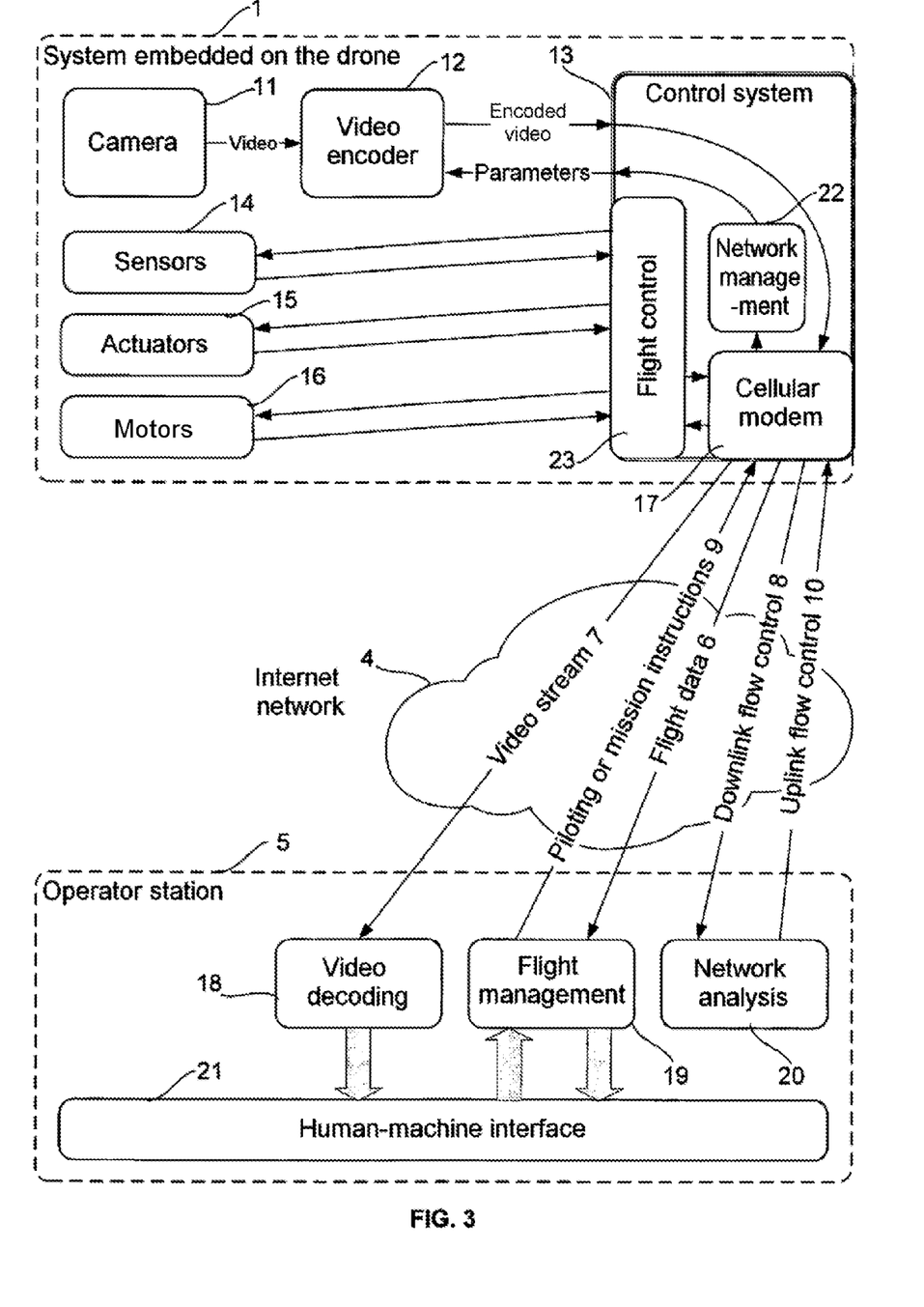
FIG. 3 illustrates these same exchanges in association with block diagrams of the main element of the electronics of the craft and of the electronics of the ground station, and FIG. 4 schematically illustrates the elements implemented in the determination of the parameters of a video encoding performed on the craft.

Referring now to FIGS. 2 and 3, the device according to the present invention comprises, in the system embedded on the drone 1, a camera 11 and video encoding means (codec) 12. A typical example of video codec used is the H.264 format described by the ISO/IEC 14496-10 standard. According to the variant embodiments, a different format can be used such as the H.262, H.263, H.264, H.265, VP6, VP7, VP8, VP9 or other formats. The role of this encoding is to transport the image in a format requiring less bandwidth than a raw video stream.

It is possible at any time to vary the parameters of the video encoder 12 such as the image definition demanded (size in pixels), the number of images per second, or even the bit rate of the video stream at the output of the encoder. It is moreover possible to vary other parameters specific to the encoding format used.

In this device, the camera 11 therefore supplies a video stream to the encoder 12, which can be hardware (electronic chip) or consist of a software block in a larger set. This encoder 12 supplies an encoded video stream to a control system 13, which is responsible for making this stream available on the Internet network. The Internet connectivity of the control system 13 is obtained by the use of a cellular modem 17 capable of providing an Internet connection by using the 2G, 3G, 3G+, H+, 4G, LTE, LTE-Advanced, 5G, WiMAX or similar mobile telecommunication networks.

The video stream is thus transmitted by Internet means by using different flow transmission protocols. These protocols can be used in a nested manner, according to the layers of the OSI (Open Systems Interconnection) model. It is therefore possible to use, for example, the UDP or TCP protocols for the lower level layers. For the higher level layers, there are, in the current state of the art, several protocols suitable for the transmission video of streams. There are for example the RTP (Real-Time Transport Protocol), RTSP (Real-Time Streaming Protocol), HLS (HTTP Live Streaming), RTMP (Real-Time Messaging Protocol), MPEG-DASH (Dynamic Adaptive Streaming over HTTP), HSS (Microsoft HTTP Smooth Streaming) protocols, or any other flow transmission protocol of the application layer of the OSI model.

This stream is transmitted to the operator station 5 via the Internet network 4 by means of one of these protocols, and is interpreted and decoded in a decoder 18 in order to be made available to the operator in a human-machine interface 21.

Figure 4:
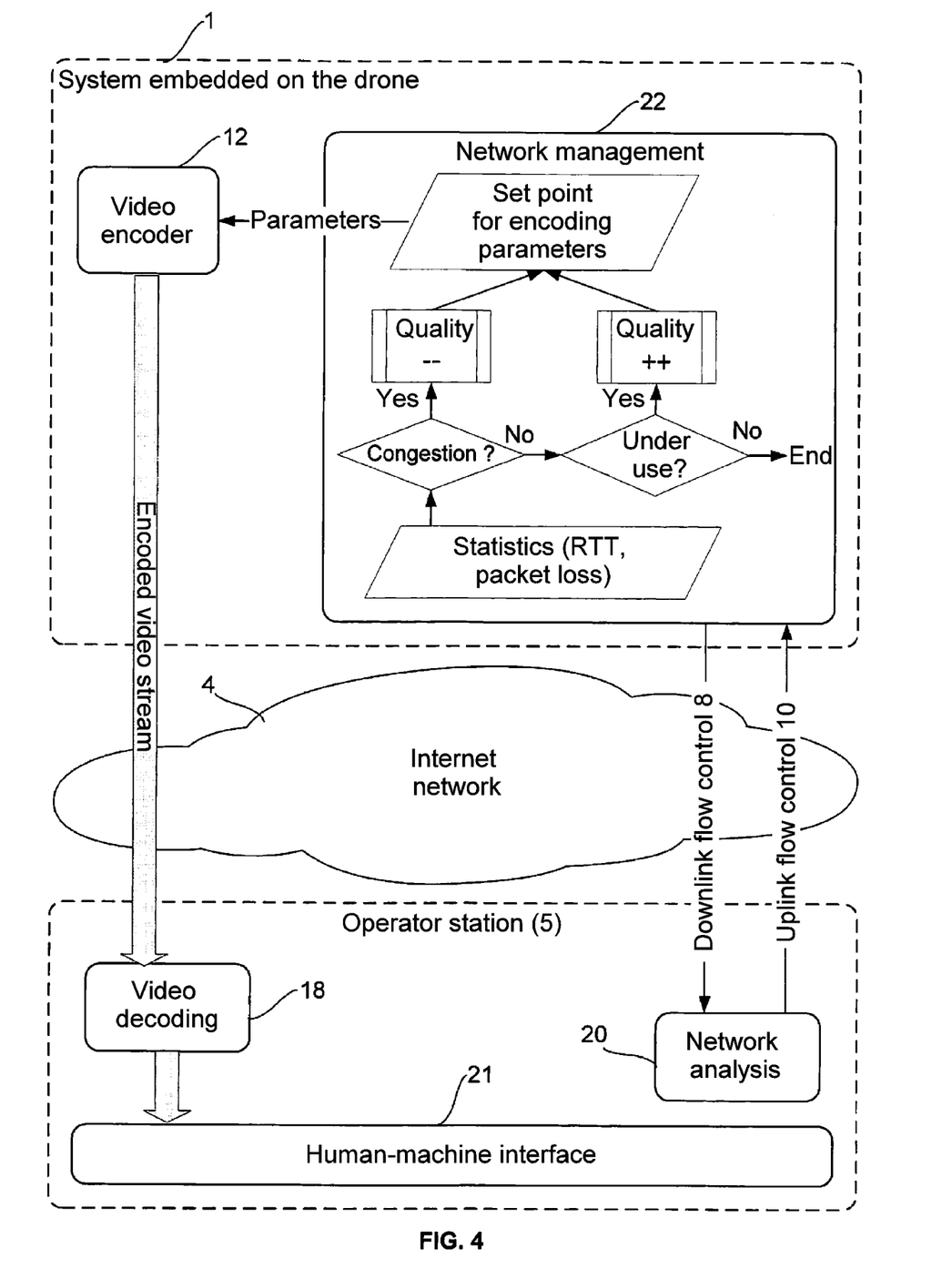

The network congestion problem is solved by the use of a means for adapting the video encoding as a function of the network capacity, as illustrated in FIG. 4. A software system or network management module 22 on the system embedded in the drone 1 transmits, at determined intervals, fixed or variable according to certain conditions, packets comprising statistics on the streams generated onboard the drone, in particular the video stream 7 or the flight data stream 6 (streams illustrated in FIG. 2). These packets also contain statistics on the use of the network, calculated by the network management software module 22 from similar packets sent this time by the operator station on the ground 5, and more particularly by the network link analysis module 20. The two software modules 20 and 22 interact so as to calculate statistics on the use of the network in the uplink direction 10 or in the downlink direction 8.

These statistics comprise, for example, the so-called RTT (Round-Trip delay Time) datum, that is to say the travel time of a packet over the network, or even the number of packets and/or of bytes transmitted, the jitter, that is to say the variation of the latency time. Moreover, the modules 20 and 22 are capable of calculating the number of packets lost (packet loss).

There are currently different technologies that make it possible to deduce these various statistics from the sending of control packets 8 and 10. The present invention mainly uses the RTCP (Real-Time Control Protocol) protocol, which can be used in combination with the RTP (Real-Time Transport Protocol) protocol, and can, according to other variant embodiments, use any other means for deducing these statistics.

Together, these statistical data make it possible to detect a congestion phenomenon due to an overestimation of the bit rate acceptable on the network link. In case of appearance of such a phenomenon, the network management module 22 supplies the video encoder 12 with new encoding parameters, in the sense of a reduction of the bit rate of the video encoded at the output of the encoder 12, even, depending on the severity of the congestion phenomenon, in the sense of a reduction of the image definition. A feedback loop is thus formed. The analysis of the data supplied by the modules 20 and 22 also makes it possible to detect a potential underuse of the network link. The network link management module 22 then sends the video encoder 12 new encoding parameters in the sense of an increase in the bit rate of the encoded video, in order to increase the quality of the video transmitted as much as possible.

In the case where it would be difficult to predict this underuse of the network, the bit rate control performed on the video encoder 12 is arbitrarily increased according to a given time interval, of five seconds for example. The feedback put in place will then be able to adjust the bit rate to a value for which the congestion phenomenon does not occur.

This system can, according to a variant embodiment, be implemented for any information stream between the drone 1 and its operator 5.

The network link analysis system, put in place by virtue of the modules 20 and 22, by flow control transmission 8 and 10, also makes it possible to reserve a portion of the available bandwidth for the transmission of the flight data between the embedded control system 13 and the operator station 5. In practice, the bit rate needed to transmit these flight data is very small (of the order of 10%) compared to the bit rate needed to transmit a quality video stream, which is of the order of 1 megabit per second. Similarly, the network link analysis module 20 makes it possible to ensure the priority of the transmission of the piloting or mission instructions 9 over that of any other datum over the network link put in place, in particular the packets intended to ensure the flow control 10.

In a preferred embodiment, the system performs a periodic measurement of the statistics linked to the use of the network, including:
 the latency,
 the rate of packets received out of order,
 the rate of packets not received,
 the rate of packets received incomplete.

These values are supplied by the combined use of the RTP (Real Time Protocol) and RTCP (Real-time Transport Control Protocol) protocols. The measurement of the statistics concerns only a small time sample in order to detect as rapidly as possible a variation in these parameters. The system embedded in the drone associates, with each operator (ground system 5) to which it is connected, a score which is a weighted average of the parameters described above. If this score is below a given threshold (invalidity threshold) then the connection is considered invalid and the piloting instructions originating from the operator concerned will not be executed by the craft, which can then implement a safety procedure (automatic return, etc.).

Another problem that such a system of the present invention has to face is the great variability of the complexities of the computer network topologies encountered at the different Internet network access points. The complexity of the computer networks can be such that the setting up of a peer-to-peer connection between the drone 1 and the station 5 of the operator may be impossible. Such is notably the case when the operators providing the access to the Internet network via 2G, 3G, 3G+, H+, 4G, LTE, LTE-Advanced, 5G, WiMAX infrastructures use devices of "firewall" or NAT (Network Address Translation) type. Now, these devices are widely used in the routers distributed at different points of the networks and restrict the accessibility or the visibility of a network termination point (peer) to another peer.

In other words, contrary to the use of a network of Wi-Fi type between drone and ground station, making it possible to use static network addresses, the network addresses of the drone 1 and of the ground station 5 are not known before the connection is set up, and are likely to change dynamically.

The use of cellular networks according to the invention therefore requires a communication initialization phase to be put in place in order for the communicating parties to exchange various information useful to the connection such as the network addresses or even the type of network architecture detected.

The present invention solves the problem of the setting up and the maintaining of the connection through different computer network topologies by means of so-called "NAT traversal" techniques. These techniques are put in place in the network link analysis modules 20 and 22 and are based on the use of network protocols such as ICE (Interactive Connectivity Establishment) specification RFC 5245. These protocols can themselves make use of other protocols such as STUN ("Session Traversal Utilities for NAT") specification RFC 5389, for the detection of the network topology, or even TURN (Traversal Using Relays around NAT) specifications RFC 5766 and 6156, for the bypassing of the "NAT" via a server acting as relay.

Many other protocols can also be used to solve these problems and the state of the art in this field is destined to change with the progressive deployment of the IPv6 (Internet Protocol version 6) system. The individual and combined use of these different techniques allows the drone and the operator station 5 to be able to set up a bidirectional communication regardless of the network topology encountered.

In a preferred embodiment, the method for maintaining the link between drone and ground station consists in the combined use of the STUN, TURN and SIP protocols. The SIP (Session Initiation Protocol) protocol is used to set up and supervise a session between the drone and its operator. This session is made up of different multimedia streams including the telemetry stream or even the video streams.

The SIP protocol has been designed in order to supervise multimedia streams of VoIP (Voice over IP) type in which the different communication parties have perfectly symmetrical roles, and has the advantage of managing the latencies well in order to avoid voice offsets. The preferred method consists in including, in the SIP messages, information making it possible to distinguish the roles of the transmitting and receiving entities in order to differentiate the drones and the operators. Preferentially, each party also indicates in the SIP messages the rights that that party is allocating to the remote party.

Moreover, unlike the case of a drone-ground station link by local area network, it is possible according to the invention to allow a set of ground operators to connect their respective ground stations 5 to one and the same drone. These operators can be assigned rights which can differ dynamically, including control of the craft or even control of a given camera.

In this case, the invalidity threshold mentioned above and the coefficients used in the weighting advantageously depend on the nature of the operator and on the rights which are associated with him or her, such that the maximum acceptable latency differs according to whether the drone is moving in automatic mode (autonomous mission), semi-automatic mode (click and go) or in manual mode (use of a joystick for real-time piloting).

Moreover, in the case where several ground stations are communicating with the drone, it is possible according to an aspect of the invention (and contrary to a single point-to-point link in the case of a local area network) to perform an arbitration at the routing level between the different flight commands. Thus, the system advantageously implements an arbitration method between the different flight commands which associates with each command a criticality which can be chosen to be:

a real-time criticality: the message must be routed as fast as possible, but the loss of the message is not critical;

a routing criticality: the message must absolutely be routed, but the message routing time is not critical.

The routing differs according to the criticality retained. The messages marked "real-time" are then routed by means of the UDP (User Datagram Protocol) transport protocol by peer-to-peer link whereas the messages marked "routing" are routed by means of the TCP (Transmission Control Protocol) protocol via the use of an intermediate server ideally placed in the network in order to mitigate any problem linked to the traversal of the transverse NATs which are infrastructures that cannot be bypassed in the commercial cellular networks.

In this way, the routing time for the "real-time" messages is minimal. Similarly, the client software on the ground station side is notified of the state of routing of the messages marked with "routing" criticality.

Typically, the flight commands associated with autonomous flight phases are thus sent with the "routing" priority, whereas all of the commands associated with the manual control of the craft are sent with "real-time" criticality.

Referring once again to FIG. 3, in the system embedded on the drone 1, different sensors 14 make it possible to analyze the flight. Among these sensors, there may for example be an inertial unit, gyroscopes, accelerometers, magnetometers, GPS, GNSS or Galileo location receivers. These sensors transmit their measurements to the control system 13, and more particularly to a system 23 dedicated to flight control. This system, based on the piloting or mission instructions 9 received, controls different actuators 15 such as servomotors, relays, etc.; as well as the propulsion means of the drone 16 such that the data from the sensors 14 are in accordance with the set point deduced from the piloting or mission instructions 9.

The human-machine interface 21 of the ground station 5 lastly makes it possible for the operator to have access to all the data necessary for him or her to make decisions. He or she can thus pilot the drone by sending piloting or mission instructions 9 via a flight management system 19 provided with different functionalities such as the decoding of the flight data 6 obtained from the system embedded on the drone 1 and the translation of the intentions of the operator into piloting or mission instructions 9 that are comprehensible to the system embedded on the drone 1.

The operator station assembly 5 can, according to a variant embodiment, be externally located on a server connected to the Internet network 4. The human-machine interface 21 is then present on this server, and access is made to it by means of an Internet application. The operator can thus pilot the drone, manage the missions, have access to the video stream and to the other information streams such as the drone 1 flight information directly from a web browser linked with the server. This variant embodiment offers the significant advantage of system portability. In effect, there is no need to install, on the computer of the operator, any software ensuring the operation of the operator station 5. This web interface can be used from any peripheral device connected to the Internet network 4, whether it be a desktop computer, a laptop computer, a cellphone, or a tablet.

Obviously, the present invention is in no way limited to the embodiment described and represented. In particular, this paper covers any new combination of means that can be produced by a person skilled in the art on the basis of said paper using his or her general knowledge, independently of the wording of the attached claims.

The invention claimed is:

1. A system for transmitting commands and a video stream between a remote-controlled drone and a ground station, the system comprising a bidirectional link between craft and ground station, at least partly implementing a commercial cellular communication network, said bidirectional link being ensured by means of a cellular modem on the craft side and conveying, on the one hand, a compressed video stream generated by a camera and a video encoding module, and, on the other hand, information belonging to a group comprising movement control commands and flight data or piloting characteristics of the remote-controlled drone, the system further comprising a network management module for managing the bidirectional link capable of (i) ensuring that said link is maintained while taking account of the variability of topology and of performance levels of the link induced by the implementation of the cellular communication network and (ii) performing an adaptation of the bit rate of the compressed video stream by reserving an incompressible portion of the bandwidth available for the routing of critical information.

2. The method as claimed in claim 1, in which the craft and the ground station communicate over the bidirectional link via a packet-based protocol.

3. The system of claim 1, in which the adaptation of the bit rate of the compressed video stream is performed by adjusting the encoding parameters of the video stream as a function of a measurement of the bandwidth of the bidirectional link from the craft to the station.

4. The system of claim 3, wherein adaptation of the bit rate comprises, in the absence of a reliable measurement of the bandwidth:
repeatedly varying the encoding parameters to progressively increase the bit rate of the compressed video stream;
detecting when the bit rate causes a congestion phenomenon; and
adjusting the encoding parameters to obtain a bit rate slightly lower than a rate which causes a congestion phenomenon.

5. The system as claimed in claim 1, in which the critical information belong to a group comprising flight data, characteristics of the piloting of the remote-controlled craft and piloting or mission instructions.

6. The system of claim 1, in which said link management means are capable of calculating a score of quality of the bidirectional link at least from the station to the craft, and neutralizing flight instructions received in the case where said score is below a threshold.

7. The system of claim 6, in which said score is established as a function of at least two measurements of characteristics of the link among the latency, the rate of packets received in disorder, the rate of packets not received and the rate of packets and the rate of packets received incomplete.

8. The system of claim 1, in which said bidirectional link management means comprise the implementation of at least one session establishment protocol and of at least one NAT traversal or bypass protocol.

9. The system as claimed in claim 8, in which the link management means are capable of including in the messages of the session establishment protocol information relating to the type of point connected, namely craft or ground station.

10. The system as claimed in claim 9, in which the link management means are capable of including in the messages of the session establishment protocol information relating to rights of a ground station over a craft.

11. The system as claimed in claim 10, in which said rights comprise rights to control the movement of the craft and rights to control the camera of the craft.

12. An assembly of a remote-controlled drone, a ground station, and a system as claimed in claim 1.

13. The set as claimed in claim 12, which further comprises at least one second ground station, one second bidirectional link between craft and ground station, at least partly implementing a cellular communication network, and second means for managing the second bidirectional link between the second ground station and the craft.

14. The set as claimed in claim 13, in which the first and second bidirectional link management means are capable of conveying information on respective rights of the two ground stations with respect to said craft.

15. The set as claimed in claim 13, in which the first and second bidirectional link management means are capable of routing critical instructions from the ground to the craft via the first bidirectional link or the second bidirectional link as a function of a type of criticality, namely temporal criticality or routing criticality.

16. An assembly of a remote-controlled drone, a first ground station a second ground station, a first system as claimed in claim 1 operative between the remote-controlled drone and the first ground station, and a second system as claimed in claim 1 operative between the remote-controlled drone and the second ground station, in which the first and second bidirectional link management means of the first and second systems are capable of conveying information on respective rights of the two ground stations with respect to said craft, said rights being different and including at least one among rights to control the drone and rights to control a drone camera.

17. An assembly of a remote-controlled drone, a first ground station a second ground station, a first system as claimed in claim 1 operative between the remote-controlled drone and the first ground station, and a second system as claimed in claim 1 operative between the remote-controlled drone and the second ground station, in which the first and second bidirectional link management means of the first and second systems are capable of selectively conveying critical instructions from the ground to the drone via the communications link of the first system or via the communications link of the second system, as a function of a type of criticality, namely temporal criticality or routing criticality.

* * * * *